Nov. 23, 1965
H. C. BRANCH ETAL
3,219,789
WELDING APPARATUS
Filed June 17, 1963
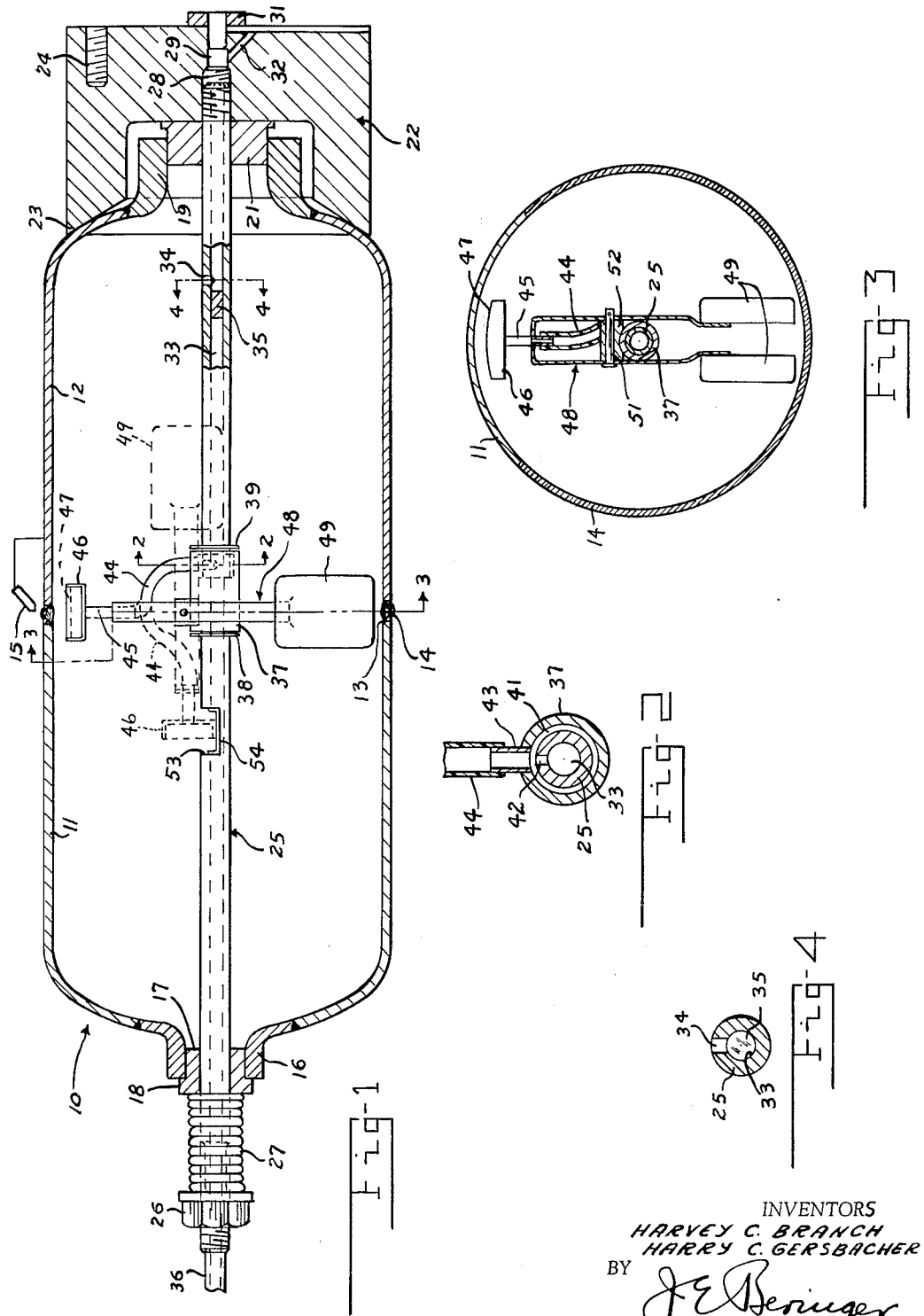
INVENTORS
HARVEY C. BRANCH
HARRY C. GERSBACHER
BY
*J E Beringer*
Their ATTORNEY United States Patent Office 3,219,789
Patented Nov. 23, 1965

3,219,789
WELDING APPARATUS
Harvey C. Branch, Centerville, and Harry C. Gersbacher, Dayton, Ohio, assignors to United Aircraft Products, Inc., Dayton, Ohio, a corporation of Ohio
Filed June 17, 1963, Ser. No. 288,185
13 Claims. (Cl. 219—60)

This invention relates to apparatus for welding, having particular regard to formation of the weld root in an arc welding process.

An object of the invention is to provide inert gas shielding to a progressively formed root of an arc weld to achieve a smooth weld root surface with a minimum of oxidation or other contamination. In the welding of a circular joint in a vessel, by way of example, it has heretofore been known to purge the interior of the vessel with an inert gas to displace oxygen. However, when welding certain readily oxidized metals such as titanium, aluminum, and the refractory metals, or when special smoothness is required, this type of shielding is inadequate to remove oxygen to a sufficiently low level. As a result the weld root may have gross physical configurations, undesirable if the vessel is to contain a rupturable bladder or the like, or the mechanical property or corrosion resistance of the weld may be impaired. It is the object of this invention, as noted, to obviate conditions as in the foregoing.

Another object of the invention is to accomplish gas shielding as described through a relatively simple apparatus adaptable for close application to a forming weld root but capable of being introduced into and withdrawn from vessels having relatively small end openings.

Other objects and structural details of the invention will appear from the following description, when read in connection with the accompanying drawings, wherein:

FIG. 1 is a view in longitudinal section, partly diagrammatic, showing welding apparatus in accordance with the illustrated form of the invention mounted in a vessel undergoing welding;

FIG. 2 is a view in cross-section, taken substantially along the line 2—2 of FIG. 1;

FIG. 3 is a view in cross-section taken substantially along the irregular line 3—3 of FIG. 1; and FIG. 4 is a view in cross-section taken substantially along the line 4—4 of FIG. 1.

Referring to the drawings, the method and apparatus of the invention have particular, although not limited, utility in connection with a vessel 10 of circular cross-section. Initially the vessel 10 comprises opposing cylindrical segments 11 and 12 which are identically formed at their adjoining ends to define a circular joint 13. Within the joint 13 weld metal 14 is deposited, as through the action of an arc welder 15 whereby to close and seal the joint 13 in a manner permanently uniting the segments 11 and 12.

The opposite ends of the vessel 10 assume configurations suited to the purpose of the vessel. Devices adaptable to such ends are used to close the ends and mount the vessel in a position for welding wherein the joint 13 is located in a transverse plane into which an arc welder 15 extends and in a position adjacent to and underlying such welder. In the illustrated instance the outer end of segment 11 is reduced to a relatively small diameter cylindrical projection 16 defining a through, end opening 16. This is, in the welding operation, closed by a bushing member 17 having a flange 18 limiting against the outer extermity of projection 16. The corresponding end of segment 12 terminates in a flaring flange portion 19 having an opening therethrough which while reduced relative to the main cross-sectional diameter of the vessel 10 is larger than opposite end flange 16. Installed in projection 19 is a bushing 21. A body 22 of substantial mass abuts bushing 21 from the rear and has a projecting cylindrical portion 23 extending toward contacting relation to the inwardly curving outer end of segment 12 prior to its termination in flange 19. The body 22 is adapted, as through tapped recesses 24, to be connected to rotary driving means to be turned selectively upon its longitudinal axis.

A tubular support rod 25 extends longitudinally through the vessel 10 and through and beyond the bushings 17 and 21 at respectively opposite ends thereof. At its one end the rod 25 is threaded to receive a nut 26, there being interposed between the nut 26 and the bushing 17 a compression spring 27. At its opposite end the rod 25 also is threaded and is received in a tapped recess 28 in the axis of body 22. The recess 28 is part of a longitudinal through bore 29 in the body 22, the outer end of which normally is closed by insert means 31. A small diameter passage 32 vents bore 29 to the exterior of the body. Tubular rod 25 has a through passage 33 therein.

In positioning the parts for welding, the two segments 11 and 12 of the vessel 10 are placed in a telescoping relation as indicated to the tubular rod 25. Installation of the end bushings 17 and 21 centers the vessel relative to rod 25 while interengagement of the ends of the rod with body 22 and with nut 26 effects a mutually supporting relation of the assembly comprising the vessel and its end mounting components. The spring 27 applies a force for closing the vessel segments 11 and 12 upon one another at the joint 13, maintaining a continuous pressure during the welding process to aid in the uniting of the parts.

In performing their mounting and centering operation relative to rod 25, the end bushings 17 and 21 substantially close the opposite ends of vessel 10. A build-up of pressure within the vessel in inhibited by means of a radial opening 34 in the rod located in a position to lie within the vessel in an assembled relation of the parts as illustrated. By means of opening 34, passage 33, bore 29 and passage 32 the interior of the vessel 10 is continuously vented to the atmosphere. Communication of the vent passage system with the opposite end of rod 25 is prevented by a plug insert 35 installed in the passage 33 adjacent to opening 34 and between such opening and the far end of the rod or that end mounting nut 26. The latter end of rod 25 is formed, beyond the threaded portion receiving nut 26, with an adapter extension 36 for connection with a flexible hose or other conduit leading from a source of gas under pressure, the gas being one of inert character such as argon or helium. On one side of the insert 35, therefore, the passage 33 communicates with a source of shielding gas under pressure and on the other side thereof the passage communicates the interior of vessel 10 to the atmosphere.

A body 37 is rotatably and slidably mounted on the support rod 25 at an intermediate location within the vessel 10, at least a portion of such body being in the transverse plane of the joint 13. Retaining rings 38 and 39 hold the body 37 in a selected position of longitudinal adjustment. Toward one end thereof the body 37 is formed with an annular groove 41 communicating through a port 42 in the support rod 25 with the gas filled portion of passage 33 therein. A hollow tubular device 43 is radially installed in body 42 to communicate at its one end with annular chamber 41. At its other end device 43 connects with one end of a flexible tube 44 the other end of which attaches to the open inner end of a tube 45. The latter terminates at its other or outer end in a cup-shaped head 46 covered at its outer end by a porous metal material 47 such as screening. The tube 45, and head 46 which is a part thereof, is rigidly carried at the closed end of a yoke 48 which straddles support rod 25 and body 37 thereon in such manner as to have its opposite ends in a diametrically opposed relation on opposite sides of the axis of rod 25. At the open end of the yoke 48, on the opposite side of rod 25, are attached weights 49. A pin 51 extends transversely through an intermediate location of the yoke 48 and through a mounting boss 52 integral with body 37 in such manner that the yoke is pivotally adjustable in one sense relative to the body 37. At the same time, however, since the yoke 48 straddles the body 37 in a close embracing relation thereto and to mounting boss 52 thereof the yoke is rotatable with the body 37 in another sense.

The yoke 38 is adapted, under the influence of weights 49, to occupy normally a position transversely of the axis of rod 25 in the transverse plane of joint 13. The length of the yoke, and of tube 45 and head 46 projecting therefrom, is predetermined, moreover, to place the outer porous cover on head 46 in adjacent aligned relation to the inner wall of the vessel or more particularly to the inner surface of joint 13. According to the construction and arrangement of parts, therefore, gas under pressure is permitted to flow from passage 33 through port 42 to chamber 41 and then by communicating connections through flexible tube 44 to head 46 where it is free to discharge as a directed stream through porous cover 47 directly upon the inner surface of joint 13. The size of the ports and passages, as well as the pressure of the admitted gas are such as to produce a copious flow from the head 46 displacing all air in the affected region of the joint 13.

An arrangement of the welding apparatus normally places the welding tool 15 in the position illustrated, closely overlying the supported vessel 10. The shielding head 46 lies directly below the weld area which is at the highest portion of the joint 13 and occupies an opposed relation to the tool 15. In a pendulum-like action this relationship is, moreover, maintained against rotation of the vessel 10 and of the support rod 25 therefor, by virtue of the weighted yoke 48 holding the gas discharge assembly continuously upright despite rotation of the rod 25. The formation of the weld is a progressive one, accomplished during a gradual turning motion of the vessel 10. The forming weld root accordingly is continuously flooded with inert gas discharging from the head 46 for a substantially total exclusion of oxygen in the region of the forming root.

The porous metal covering 47 serves a diffusion function, preventing a direct and forceful impingement of the gas stream upon the inner vessel wall of the kind which might disturb the molten weld metal and cause an irregular surface condition. By directing copious amounts of inert gas at the area of the forming weld root the complete isolation of such area from atmospheric conditions inhibits gross oxidation and possible impairment of the weld's mechanical properties as well as its resistance to corrosion. Also, as long as air is prevented from reaching the molten weld metal, and the formation of a rigid oxide film is thereby prohibited, such metal will develop a smooth and uniformly contoured surface due to the surface tension forces acting upon it. Accordingly, when the molten weld metal solidifies the resulting weld surface will innately be smooth and free from sharp discontinuities.

The rotary mounting of the yoke 48 upon boss 52 allows the yoke and associated parts to be adjusted from a position transversely of the axis of the rod 25 to a position more nearly parallel thereto, as for example a position as shown in dotted lines in FIG. 1. So positioned the yoke and discharge head are adapted more readily to be introduced into and withdrawn from the vessel interior by means of the larger end opening of the vessel. To reduce the lateral dimensions of the rod and gas discharge assembly to a maximum extent, a portion of the rod is cut away to define a recess 53 closed by an insert plate 54.

The usefulness of the apparatus is not limited by the location of the axis opening in the end of the vessel. As long as the vessel is rotated around a center line normal to the plane of the weld and as long as the hinged joint between the shielding head unit and the support rod is located approximately at the intersection of this center line and the plane of the weld then the apparatus will provide proper shielding. The distance between the axis of tube 25 and the outer surface of porous covering 47 of the shielding head is slightly less than the inside radius of the vessel 10. The construction and arrangement of parts provides for a continuous maintaining of this relationship throughout rotary motions of the vessel.

What is claimed is:

1. Shielding apparatus useful in the arc welding of circular section vessels, including an elongated rotatable support member adapted to extend longitudinally through the vessel, means for mounting the vessel to said member for unison rotation, said vessel presenting in a transverse plane thereof a joint for welding, the weld being effected by a relatively stationary tool located in said transverse plane outside said vessel, gas discharge means relatively rotatably mounted on said support member to lie within said vessel and including a head portion extending into adjacent relation to the inside surface of said vessel in the transverse plane of said joint, means inhibiting rotation of said gas discharge means with said support member, and means for supplying an inert gas through said member to said discharge means for application to the forming weld root.

2. Shielding apparatus useful in the arc welding of circular section vessels, including an elongated rotatable support member adapted to extend longitudinally through the vessel, means for mounting the vessel to said member for unison rotation, said vessel presenting in a transverse plane thereof a joint for welding, the weld being effected by a relatively stationary tool located in said transverse plane outside said vessel, means for flowing an inert gas through said support member to the interior of the vessel, and means for discharging said gas in an oxygen displacing stream directly upon the forming weld root, said means being mounted to said support member to occupy a stationary position as against the rotation of said member.

3. Shielding apparatus useful in the arc welding of a circular section vessel having in a transverse plane thereof a joint for welding, including an elongated support member adapted to extend longitudinally through the vessel in intersecting relation to said plane, means for supplying an inert gas to the interior of said vessel through said support member, and means on said member in said plane for discharging the admitted gas in a copious oxygen displacing flow directly upon the interior surface of the vessel at the location of said joint.

4. Shielding apparatus according to claim 3, characterized in that said last named means includes a discharge head member rotatably mounted on said support member and weighted to occupy an upright position irrespective of turning motions of said support member.

5. Shielding apparatus useful in the arc welding of circular section vessels including an elongated support member, a swivel device rotatably mounted to said member intermediate the ends thereof including a gas discharge head extending radially of said member and a pendulum portion tending to maintain said head in a fixed angular position of rotary adjustment despite turning motion of said member, and means for conducting shielding gas through said support member to said device and outwardly thereof through said head.

6. Shielding apparatus according to claim 5, wherein said head and said pendulum portion comprise a connected sub-assembly in said device, said sub-assembly being independently pivotally adjustable toward parallel relation to said support member to reduce the lateral dimensions of the assembly comprising said device and said support member.

7. Apparatus useful in the arc welding of circular section vessels, including an elongated rotatable support member, means for mounting a circular section vessel on said member for unison rotation therewith, adjoining segments of the vessel defining a joint in a transverse plane intersected by said support member, a body rotatable on said support member and located longitudinally thereof to lie within the vessel, conduit means extending radially outward from said body into the plane of said joint and terminating adjacent to the internal wall of the vessel, and means for supplying through said support member and said body to said conduit a flow of an inert shielding gas for discharge on the weld root as said joint is welded.

8. Apparatus useful in the arc welding of circular section vessels, including an arc welder, means for supporting vessel segments in opposing contacting relation, said welder projecting approximately into the transverse plane of the joint defined by said contacting segments, said welder and said vessel segments being arranged for relative rotation whereby said joint is exposed progressively to the action of said welder, and means located interiorly of the assembled vessel and stationary relative to the welder for providing inert gas shielding to the root of the progressively forming weld, said last named means comprising a pendulum influenced discharge head in the plane of said joint and reaching into adjacent relation thereto, and a tubular support therefor extending coaxially of the assembled vessel longitudinally thereof and having a passage for admitting the shielding gas to said head.

9. Apparatus useful in the arc welding of circular section vessels, including a tubular support rod, means for mounting vessel segments in opposing relation on said rod, adjacent or adjoining edges of said vessel defining a joint for welding, said mounting means cooperating with said rod to close the ends of the assembled vessel, means for introducing through said rod to the interior of the assembled vessel an inert shielding gas, and means on said rod for conducting incoming gas flow radially outward for direct discharge in a limited area on the inner wall of the assembled vessel in the plane of said joint.

10. Apparatus according to claim 9, characterized by other means for venting the interior of the assembled vessel through said rod.

11. Apparatus according to claim 9, characterized in that said last named means includes a conduit terminating at its outer end in a diffusion head.

12. Apparatus according to claim 9, characterized in that said last named means includes a body rotatable on said rod, a conduit connected to said body and terminating in a diffusion head adjacent to the wall of the vessel, and a mount for said conduit pivotally connected to said body and weighted to maintain a projection thereof, said mount and conduit being adjustable toward a generally parallel position to said rod.

13. Apparatus useful in the arc welding of circular section vessels having limited access through the ends thereof, including a tubular vessel support rod adapted to extend longitudinally through the vessel and having a passage for conducting a shielding gas from a location outside the vessel to a location within the vessel, a body rotatable on said rod at said last mentioned location and having a chamber receiving the gas, a yoke straddling said rod and pivotally connected to said body, a diffusion head attached to said yoke, and means weighting said yoke to maintain a radially projecting outwardly facing position of said head despite turning of said rod, said yoke being adjustable against the influence of said weighted means to a position more nearly parallel to the rod for admission to and withdrawal from the vessel.

References Cited by the Examiner
UNITED STATES PATENTS
2,254,792   9/1941   Brown _____ 113—59 X RICHARD M. WOOD, *Primary Examiner.*